Patented June 19, 1934

1,963,258

UNITED STATES PATENT OFFICE 1,963,258

MANUFACTURE OF VALUABLE PRODUCTS BY OXIDATION AND DECARBOXYLATION OF AROMATIC COMPOUNDS

Johannes Bröde, Ludwigshafen-on-the-Rhine, and Adolf Johannsen, Mannheim, Germany, assignors to I. G. Farbenindustrie Aktiengesellschaft, Frankfort-on-the-Main, Germany, a corporation of Germany No Drawing. Application April 21, 1928, Serial No. 271,968. In Germany November 27, 1925

12 Claims. (Cl. 260—168)

This invention relates to the production of valuable products by oxidation and decarboxylation of aromatic compounds.

This application is a continuation in part of our copending application Ser. No. 149,520, filed November 19, 1926.

In the aforesaid application for Patent Ser. No. 149,520 we have shown that monocarboxylic acids can be produced from dicarboxylic acids or their anhydrides by passing the same together with water vapor or gases or gas mixtures containing water vapor at temperatures between about 250° and 500° C. over catalysts capable of splitting off carbon dioxid.

As stated in the aforesaid copending application all kinds of catalysts which are capable of splitting off carbon dioxid may be employed. For example carbonates which are stable at the temperature of working such as sodium carbonate and calcium carbonate, or oxids, hydroxids or silicates of most various elements, or mixtures of several such substances may be employed. For example the oxids of zinc, cadmium, lead, bismuth, silicon, aluminium, titanium, iron and nickel give very good results. The efficiency of these catalysts may be considerably increased by activating additions, in particular small quantities of oxids of other metals. Also mixtures of several such catalysts whether of natural or of artificial origin, for example bauxite, may be employed with good results. Metallic catalysts, for example granulated aluminium, are also efficient. Preferably the catalysts are employed in conjunction with suitable supports such as pumice stone, clay or the like.

The reaction is advantageously carried out with an excess of water vapor over the quantity theoretically required; however, the process may also be carried out by exposing the vapor mixture formed by heating dicarboxylic acids (which mixture consists probably of the dicarboxylic acid, its anhydride and water vapor) directly over the catalyst. When starting from dicarboxylic acid anhydrides, an addition of water vapor to the anhydride vapor is necessary.

The operation with a gas or air current containing water vapor often offers advantages over the use of water vapor alone, as, for example in the conversion of phthalic anhydride into benzoic acid, the concentration of the water vapor and the temperature at which the separation of the reaction products takes place, may be so chosen as to obtain the reaction product directly in a solid, practically dry form; this results in the purification and further use of the reaction product being much facilitated.

The dicarboxylic acid anhydrides employed as initial materials in the process above described, for example phthalic anhydride, maleic anhydride and the like, may be obtained by the catalytic oxidation of vapors of hydrocarbons or their derivatives such as naphthalene, naphthol, benzene, phenol and the like. Certain dicarboxylic acid anhydrides, for example succinic anhydride may also be obtained by the hydrogenation of anhydrides of unsaturated dicarboxylic acids such as maleic anhydride.

We have further found that when the dicarboxylic acid anhydrides are prepared by catalytic reactions in the vapor phase, such for example as have been mentioned before, it is not necessary to separate the anhydride from the reaction mixture, but the latter may be passed directly, or after an addition of water vapor has been made, over the catalyst capable of splitting off carbon dioxid. This method of working is of particular advantage when the anhydrides are prepared by the catalytic oxidation of hydrocarbons or derivatives thereof.

It is even possible to subject organic compounds several times to catalytic oxidation and catalytic splitting off of carbon dioxid, without an intermediary separation of the reaction products being necessary. By this manner of working the conversion gradually proceeds further and further. The order of the single operations depends of course on the result to be obtained. The combination of operations most suitably to be employed and the most favorable conditions of working cannot be precisely indicated in a general way, as they depend on the nature of the compounds to be treated and to be obtained, but they can easily be ascertained by some tests.

According to this process, for example acenaphthene may be converted by repeated oxidation and decarboxylation, i. e. splitting off carbon dioxid, into formaldehyde with the following products being obtained as intermediary products, viz. naphthalic anhydride, naphthoic acid, naphthalene, phthalic anhydride, benzoic acid, benzene, benzoquinone, maleic anhydride, acrylic acid and ethylene. Starting from naphthalene or its substitution products such as alkyl-naphthalenes, hydroxy-naphthalenes, nitro-naphthalenes and the like, in a similar manner phthalic anhydride, benzoic acid, benzene, benzoquinone, maleic anhydride, acrylic acid, ethylene and formaldehyde can be obtained. Salicylic acid can be converted into phenol, benzoquinone, maleic anhydride, acrylic acid, ethylene and formaldehyde. In a similar manner other organic compounds can be stepwise converted into valuable decomposition products. Of course the process may be interrupted at any desired stage after the initial material has undergone at least once both the catalytic oxidation and catalytic decarboxylation.

Generally the various treatments are carried out one after the other, as in such case the conditions as to temperature, pressure, concentration of the organic compound in the gas mixture and so forth, can be maintained in the most favorable range. In case the most favorable conditions as regards the temperature, speed of the gas current, rate of dilution, and the like, to be maintained in two or more subsequent stages are about the same, the oxidation and decarboxylation may be carried out simultaneously by employing a mixture of the oxidizing catalyst with the catalyst capable of splitting off carbon dioxid. However, this manner of working is in most cases not very advantageous. Thus, for example in the manufacture of benzoic acid from naphthalene with the intermediary production of phthalic anhydride, the resulting benzoic acid is very sensitive to oxidation, while on the other hand the oxidation of naphthalene to phthalic anhydride requires rather strong conditions as regards the catalyst and the temperature; therefore, if in this case the oxidation and decarboxylation are carried out simultaneously, a considerable part of the benzoic acid formed is further oxidized, so that the yield is rather low; therefore, in this instance the two stages should not be combined into a single one.

In the process last described care should be taken that in the catalytic decarboxylation of a dicarboxylic acid anhydride into a monocarboxylic acid, water vapor is present in sufficient amounts. For the catalytic oxidation materials capable of supplying oxygen, such as carbon dioxid, water vapor and the like may be employed instead of or along with oxygen or oxygen-containing gases such as air. When the initial material is subjected to several oxidations or decarboxylations, it is of course not necessary to employ the same catalysts throughout, but each operation may be carried out with the catalyst best suitable for the desired reaction.

The process here described may also be combined with other catalytic reactions such for example as hydrogenation, dehydrogenation, hydration and the like.

As will be obvious from the foregoing explanations, it may in some cases happen that two decarboxylations are to be carried out one after the other and we have found that in such cases these two stages may be combined into a single one by employing stronger conditions of working than are necessary and suitable for carrying out only one of the said stages.

The following examples will further illustrate how our invention may be carried out in practice, but the invention is not limited to these examples.

Example 1

A mixture of air and naphthalene vapor is passed over a contact mass containing vanadium pentoxid at 400° C. and the reaction mixture thus formed containing water vapor is cooled to 380° C. and brought into contact with a catalyst containing the oxids of cadmium and aluminium. The benzene formed may be recovered from the gas mixture leaving the reaction chamber by absorption by means of tar oils of high boiling point or by absorption by means of active charcoal or by any other suitable method.

Instead of the mixture of air and naphthalene vapor a mixture of naphthalene vapor, oxygen and water vapor may be used in the same way. In this case the benzene formed may be condensed together with the water vapor. Instead of naphthalene, methyl-naphthalene or other derivatives of naphthalene or mixtures thereof may be employed as initial materials.

If the oxidation be carried out in such a manner as to produce substantial amounts of naphthoquinone in addition to the phthalic anhydride primarily formed these two products can be separated from each other only with difficulty. If, however, the mixture is subjected in the manner described to a treatment with catalysts capable of splitting off carbon dioxid, the naphthoquinone which remains unattacked can easily be separated from the benzene formed, so that the process according to the present invention is very advantageous also for the manufacture of pure quinones.

Example 2

A mixture of air and naphthalene vapor is passed over a contact mass containing vanadium pentoxid at a temperature of 400° C. The products of the reaction containing water vapor are cooled to 390° C. and passed over a contact mass containing the oxids of zinc, cadmium and aluminium, and then if required after being mixed with preheated air, passed over a catalyst containing salts of vanadic acid at a temperature of 410° C. The maleic anhydride formed may be obtained by cooling in the form of anhydride or by washing with water in form of maleic acid. Benzoquinone is obtained as bye-product.

Example 3

Naphthalene is subjected to catalytic oxidation in a suitable manner so as to produce phthalic anhydride and the resulting gas mixture is passed with an addition of water vapor at 390° to 420° C. over a catalyst consisting of a mixture of cadmium oxid, zinc oxid and aluminium oxid precipitated on to pumice stone. After cooling the reaction mixture the benzene formed can be separated by scrubbing with tar oils or by absorption by means of active carbon or in any other suitable manner. Care must of course be taken to maintain the concentration of the phthalic anhydride in the gas mixture so that no explosive mixture is formed.

Example 4

Acenaphthene is catalytically oxidized to naphthalic anhydride and the resulting gas mixture is passed after an addition of water vapor at temperatures between 370° and 380° C. over a mixture of zinc oxid and aluminium oxid. On cooling the reaction mixture naphthalene is separated in addition to small quantities of unaltered naphthalic anhydride.

When in the claims hereunto appended we speak of "a carboxylic acid substance" we wish to comprise thereby monocarboxylic acids, dicarboxylic acids and dicarboxylic anhydrides; similarly the term "a dicarboxylic acid substance" is meant to comprise the free dicarboxylic acids as well as their anhydrides.

What we claim is:—

1. The process which comprises subjecting an aromatic hydrocarbon in the vapor phase in succession to both catalytic oxidation to a product comprising a carboxylic acid substance, and catalytic decarboxylation, without separation of the intermediary products, at least one of the said reactions taking place twice, said catalytic oxidation being carried out by passing the vapors of the substance to be oxidized together with a gas comprising free oxygen over an oxidation catalytic agent and said catalytic decarboxylation being effected by passing the vapors of the substance to be treated over a catalyst capable of splitting off carbon dioxide while taking care that water vapor is present at least in the conversion of a dicarboxylic anhydride into a monocarboxylic acid and that an oxidation step is followed in every instance by a decarboxylation step.

2. The process which comprises subjecting an aromatic hydrocarbon in the vapor phase in succession to both catalytic oxidation to a product comprising a carboxylic acid substance and catalytic decarboxylation, without separation of the intermediary products, at least one of the said reactions taking place twice, said catalytic oxidation being carried out by passing the vapors of the substance to be oxidized together with a gas comprising free oxygen at between 250° and 550° C. over an oxidation catalytic agent and said catalytic decarboxylation being effected by passing the vapors of the substance to be treated at between about 250° and 500° C. over a catalyst capable of splitting off carbon dioxide while taking care that water vapor is present at least in the conversion of a dicarboxylic anhydride into a monocarboxylic acid and that an oxidation step is followed in every instance by a decarboxylation step.

3. The process which comprises subjecting a polynuclear aromatic hydrocarbon in the vapor phase in succession to both catalytic oxidation to a product comprising a carboxylic acid substance and catalytic decarboxylation, without separation of the intermediary products, at least one of the said reactions taking place twice, said catalytic oxidation being carried out by passing the vapors of the substance to be treated together with a gas comprising free oxygen at between 250° and 550° C. over an oxidation catalytic agent and said catalytic decarboxylation being effected by passing the vapors of the substance to be treated at between about 250° and 500° C. over a catalyst capable of splitting off carbon dioxide while taking care that water vapor is present at least in the conversion of a dicarboxylic anhydride into a monocarboxylic acid and that an oxidation step is followed in every instance by a decarboxylation step.

4. The process which comprises subjecting naphthalene in the vapor phase in succession to both catalytic oxidation to a product comprising a carboxylic acid substance and catalytic decarboxylation, without separation of the intermediary products, at least one of the said reactions taking place twice, said catalytic oxidation being carried out by passing the vapors of the substance to be treated together with a gas comprising free oxygen at between 250° and 550° C. over an oxidation catalytic agent and said catalytic decarboxylation being effected by passing the vapors of the substance to be treated at between about 250° and 500° C. over a catalyst capable of splitting off carbon dioxide while taking care that water vapor is present at least in the conversion of a dicarboxylic anhydride into a monocarboxylic acid and that an oxidation step is followed in every instance by a decarboxylation step.

5. The process which comprises catalytically oxidizing an aromatic hydrocarbon by passing the vapors of said hydrocarbon together with a gas comprising free oxygen at between 250° and 550° C. over an oxidation catalytic agent, thereby producing a dicarboxylic anhydride, and subjecting the resulting gas mixture without separation of the intermediary products at least twice to catalytic decarboxylation by passing said gas mixture at between about 250° and 500° C. over a catalyst capable of splitting off carbon dioxide.

6. The process which comprises catalytically oxidizing a polynuclear aromatic hydrocarbon by passing the vapors of said hydrocarbon together with a gas comprising free oxygen at between 250° and 550° C. over an oxidation catalytic agent, thereby producing a dicarboxylic anhydride, and subjecting the resulting gas mixture without separation of the intermediary products at least twice to catalytic dicarboxylation by passing said gas mixture at between about 250° and 500° C. over a catalyst capable of splitting off carbon dioxide.

7. The process which comprises catalytically oxidizing naphthalene by passing the vapors thereof together with a gas comprising free oxygen at between 250° and 550° C. over an oxidation catalytic agent, thereby producing a dicarboxylic anhydride, and subjecting the resulting gas mixture without separation of the intermediary products at least twice to catalytic dicarboxylation by passing said gas mixture at between about 250° and 500° C. over a catalyst capable of splitting off carbon dioxide.

8. The process which comprises catalytically oxidizing an aromatic hydrocarbon by passing the vapors of said hydrocarbon together with a gas comprising free oxygen at between 250° and 550° C. over an oxidation catalytic agent, thereby producing a dicarboxylic anhydride, and subjecting the resulting gas mixture without separation of the intermediary products to a strong catalytic decarboxylation by passing said gas mixture at between about 250° and 500° C. over a catalyst capable of splitting off carbon dioxide, thereby splitting off both carboxyl groups.

9. The process which comprises catalytically oxidizing a polynuclear aromatic hydrocarbon by passing the vapors of said hydrocarbon together with a gas comprising free oxygen at between 250° and 550° C. over an oxidation catalytic agent, thereby producing a dicarboxylic anhydride, and subjecting the resulting gas mixture without separation of the intermediary products to a strong catalytic decarboxylation by passing said gas mixture at between about 250° and 500° C. over a catalyst capable of splitting off carbon dioxide, thereby splitting off both carboxyl groups.

10. The process which comprises catalytically oxidizing naphthalene by passing the vapors thereof together with a gas comprising free oxygen at between 250° and 550° C. over an oxidation catalytic agent, thereby producing a dicarboxylic anhydride, and subjecting the resulting gas mixture without separation of the intermediary products to a strong catalytic decarboxylation by passing said gas mixture at between about 250° and 500° C. over a catalyst capable of splitting off carbon dioxide thereby splitting off both carboxyl groups.

11. The process which comprises catalytically oxidizing naphthalene by passing the vapors thereof together with a gas comprising free oxygen at between 250° and 550° C. over an oxidation catalytic agent, thereby producing phthalic anhydride, and passing the resulting gas mixture at about 380° C. over a catalyst comprising essentially cadmium oxide and aluminium oxide.

12. The process which comprises catalytically oxidizing napthtalene by passing the vapors thereof together with a gas comprising free oxygen at between 250° and 550° C. over an oxidation catalytic agent, thereby producing phthalic anhydride, subjecting the resulting gas mixture without separation of the intermediary products to a strong catalytic decarboxylation by passing said gas mixture at between about 250° and 500° C. over a catalyst capable of splitting off carbon dioxide, thereby splitting off both carboxyl groups of the phthalic acid, and then subjecting the resulting gas mixture to catalytic oxidation in the presence of free oxygen by passing it over a catalyst comprising essentially vanadium oxide at between 300° and 600° C.

JOHANNES BRÖDE.
ADOLF JOHANNSEN.